United States Patent [19]

Guillaume

[11] 3,914,735

[45] Oct. 21, 1975

[54] RELIABLE SAFETY ALARM DEVICE FOR AUTOMOTIVE VEHICLE WITH ENGINE TIME DELAY STOP AND STARTER OVERRIDE

[76] Inventor: Léon Guillaume, 46 Avenue de la Victoire, Neufchateau, Belgium

[22] Filed: June 7, 1973

[21] Appl. No.: 367,901

[30] Foreign Application Priority Data

June 15, 1972 Belgium .............................. 118727

[52] U.S. Cl. .............. 340/52 F; 180/103; 307/10 R
[51] Int. Cl.² .......................................... B60Q 5/00
[58] Field of Search .......... 340/52 R, 52 F, 53, 412, 340/415, 309.1; 307/10 AT, 10 R, 215; 180/103; 290/37 R, 38 R, 41

[56] References Cited
UNITED STATES PATENTS

| | | | |
|---|---|---|---|
| 3,154,168 | 10/1964 | Wilmot | 180/103 |
| 3,414,783 | 12/1968 | Moore | 307/215 |
| 3,597,661 | 8/1971 | Isaacs | 340/52 R |
| 3,656,101 | 4/1972 | Akeley | 180/103 |
| 3,659,113 | 4/1972 | Wagner | 340/52 F |
| 3,711,827 | 1/1973 | Houseman | 340/52 F |

Primary Examiner—John W. Caldwell
Assistant Examiner—Joseph E. Nowicki
Attorney, Agent, or Firm—Sughrue, Rothwell, Mion, Zinn & Macpeak

[57] ABSTRACT

A safety device for an automotive vehicle comprises one or several monitoring elements for monitoring one or several physical parameters of the vehicle, and control means coupled to a point in the electric ignition circuit of the vehicle. In response to an alarm signal produced by at least one of the monitoring elements, the safety device operates to cut off the electric supply to the vehicle ignition circuit. The safety device further comprises a time delay means connected between the monitoring elements and the control means to delay the alarm signal from at least one of said monitoring elements during a first predetermined time interval. Compensating circuit means including a second time delay operates in response to an electric signal generated when the starter is operated whereby a signal is applied to the control means input during a second, shorter predetermined time interval thereby to inhibit the action of the alarm signal from the first time delay output during the second time interval.

7 Claims, 1 Drawing Figure

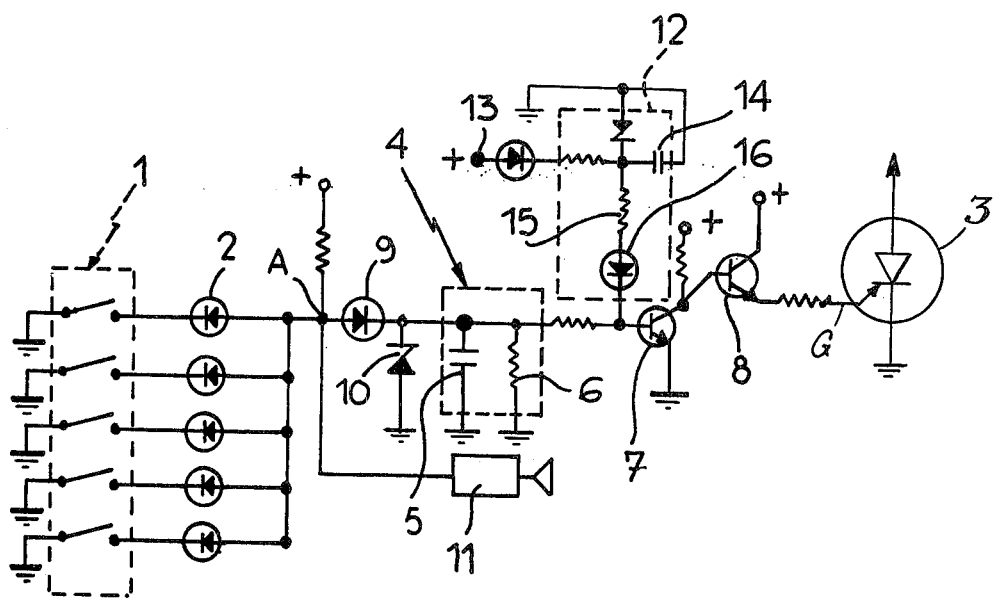

RELIABLE SAFETY ALARM DEVICE FOR AUTOMOTIVE VEHICLE WITH ENGINE TIME DELAY STOP AND STARTER OVERRIDE

The present invention relates to a safety device for an automotive vehicle to control the operation of the engine depending on the state of one or several physical parameters such as fluid pressure, temperature of an element or fluid, a fluid level and the like.

In the operation of automotive vehicles, it is of prime importance that the lubricating system, the cooling system or the brake fluid system be kept free from any failure which could be detrimental to the response or the lifetime of the mechanisms and to the driving safety as well. Visual indicators are usually provided to warn the driver of a number of parameter failures.

A safety device to prevent the engine rotation as soon as a physical parameter, such as oil pressure, does not meet a particular condition is known. This device comprises one or several elements to monitor determined physical parameters, and control means coupled to a point in the electric ignition circuitry of the vehicle and responsive to an alarm signal produced by one of said monitoring elements to cut off the electric supply to said ignition circuitry. In case of an internal combustion engine for instance, the control means would typically short the circuit-breaker so as to prevent a spark discharge from occurring in the secondary circuit of the ignition coil. In case of an injection or turbine engine, the control means would establish a return to ground from an electro-magnet controlling the injection pump.

Such a safety device immediately responds to the action of a monitoring element and instantaneously stops the engine. However, instantaneously stopping the engine constitutes a serious drawback. It may be, for instance, that the vehicle is stopped in front of a red signal light, in a blocked cross-road or other area of traffic congestion, or on a tramway line, and that after the safety device has operated, the vehicle cannot mechanically leave vicinity and thus temporarily blocks the traffic.

Also it may happen that the vehicle is engaged in passing beyond another one or a like operation which should terminate safely before operation of the safety device.

The object of the invention is a safety device which does not have the above drawback and operates quite reliably.

According to the invention there is provided a safety device comprising a time delay means coupled betwen the monitoring elements and the control means to delay the alarm signal produced by at least one of the monitoring elements during a first predetermined time interval. Compensating means is connected to the input of the control means and is responsive to an electric signal generated by the starter to apply an input signal to the control means during a second predetermined time interval thereby to inhibit the action of the alarm signal from the time delay means during the said second time interval.

A warning device e.g. an acoustic or visual device, is connected to the time delay means input to warn the driver that a physical parameter which governs the operation of the vehicle does not meet the conditions required to safeguard the vehicle or its operation and that the vehicle is on the point of stopping.

The appended drawing schematically and illustratively represents an embodiment of the safety device of the invention, in its electronic version.

The safety device of the invention is responsive to an alarm signal from one or several monitoring elements for physical parameters such as a pressure level, an element or fluid temperature, a fluid level (e.g. brake fluid) and the like.

Each monitoring element can comprise any suitable device adapted to sense a particular physical parameter and to produce an electric signal when said parameter does not meet a predetermined condition any more, e.g. when a critical temperature is reached or when a pressure level falls under a predetermined value.

In the schematic drawing of the safety device the monitoring elements 1, are symbolically represented each by a normally open switching contact which is closed when the respective monitoring element has operated. Each monitoring element is associated with a decoupling diode 2, the anodes of said diodes being connected in parallel.

In the illustrated embodiment the control means is comprised of a silicon controlled rectifier element SCR 3 having its cathode-to-anode junction shunting a point in the electric ignition circuit to ground. With an internal combustion engine, for instance, the SCR 3 will be connected in shunt with the circuit-breaker causing the overtension to occur across the primary winding of the ignition coil. With an injection engine, the SCR 3 will be connected in the return path to ground from an electro-magnet controlling the injection pump.

Gate G of SCR 3 is coupled to the paralleled monitoring elements 1 through time delay means 4 comprising capacitor 5 and resistor 6, and switching means comprising transistors 7 and 8. Diode 9 is a simple decoupling element.

A Zener diode 10 is connected in shunt with the input of time delay means 4 to stabilize the voltage across capacitor 5. The capacitance value of capacitor 5 and the resistance value of resistor 6 are adjusted such as to provide a determined time constant. In addition, resistor 6 is advantageously chosen such as to produce a comparatively high leakage current relative to the leakage current of capacitor 5. In this manner stabilization is kept at some percent only of the total leakage current.

Transistor 7 has its base coupled to the time delay means output through a limiting resistor, its emitter coupled to ground and its collector coupled to a positive voltage and to the base of transistor 8. The collector of the latter is coupled to a positive voltage and the emitter thereof is coupled to the gate G of SCR 3 through a limiting resistor.

A warning device 11 is coupled to terminal A and can be comprised of any acoustic or visual device such as a buzzer or a multivibrator and lamp.

In normal operation, all monitoring elements 1 are open, transistor 7 is positively biased through diode 9 and conducts. The collector potential thereof is then at ground level and transistor 8 is non-conducting. The gate potential of SCR 3 then is insufficient to gate it.

In emergency condition, i.e. when at least one of said monitoring elements 1 has operated, an alarm signal is present at terminal A and operates buzzer 11. In the illustrated embodiment, the alarm signal is a ground that is applied to the cathode of the respective diode 2. The latter becomes conducting so that terminal A is grounded. The voltage which was present across capacitor 5 is then removed by discharging through resistor 6 with the time constant determined by the magnitudes of the elements 5 and 6. This time constant may be on the order of 60 seconds, for instance.

Transistor 7 then becomes non-conducting, and a positive potential is present on the base of transistor 8. The latter is thus rendered conducting, and gate G is at a sufficient potential to gate SCR 3 and to apply a ground to a point in the electric ignition circuit of the engine, whereby the engine will stop.

The safety device should of course be responsive to abnormal conditions of one or several physical parameters but it is allowed to be responsive only when said abnormal conditions are likely to jeopardize the safety of the vehicle operation. For instance, during starting of the vehicle the oil pressure, though less than its rated value, should not operate the safety device since the latter would then prevent the engine from starting. Therefore, means are provided in the device of the invention in the form of a compensating circuit 12 which is responsive to an electric signal applied at terminal 13 when the starter is operated to inhibit the effect of the alarm signal. This circuitry essentially comprises a second time delay circuit formed by capacitor 14 and resistor 15, associated with decoupling diode 16 having its cathode coupled to the base of transistor 7. The electric signal generated by the operation of the starter charges capacitor 14 which retains its charge for a time interval determined by the time constant that is fixed by elements 14 and 15. A Zener diode can advantageously be used to stabilize the potential on capacitor 14.

During said time interval, the voltage across capacitor 14 is applied to the base of transistor 7 thereby inhibiting the effect of the closure of one of the monitoring elements 1. During this time interval, transistor 7 thus is isolated from the influence of the alarm signal and therefore SCR 3 will not be gated. The time constant of delay circuit 14-15 is adjusted depending on the engine characteristics. By way of example, said time constant can be of a few seconds only.

A particularly attractive advantage of the arrangement described above is that it assures an absolute safety because of its own reliability. It is of prime importance that a safety device is in condition for operation as soon as an alarm occurs. It is thus necessary to prevent any failure in the safety device itself. Such an absolute reliability is assured in the safety device of the invention by it being selfmonitored. That is, it is permanently biased by the potential applied through diode 9 in such a way that any failure which might occur in its own circuitry would result in removing the bias on the base of transistor 7 and so disabling the latter such that SCR 3 is gated on. The vehicle engine thus can start only when the safety device is in condition for operation.

The invention is obviously nowise limited to the described embodiment and it is understood that many variations can be made by one skilled in the art regarding the nature and arrangement of the active elements for the purpose of the invention. For example, the SCR element can be replaced by any suitable switching device, in an electronic form or the like, which performs an equivalent function to that disclosed in the foregoing. Though transistors of npn-type are used in the illustrated embodiment, it will be apparent to one of ordinary skill in the art that pnp-type transistors can be used as well provided the bias potentials are reversed accordingly as is well known in the art.

What is claimed is:

1. In an automotive vehicle including an engine, an ignition circuit for the engine, a source of electric current for the ignition circuit, starter means to energize the ignition circuit from said source of electric current, and a mechanism whose operation is governed by at least one physical parameter, a safety device comprising:
   a monitoring element for said at least one physical parameter to produce an alarm signal when the physical parameter sensed thereby reaches a predetermined threshold value,
   control means having an input and coupled to a point in said ignition circuit and responsive to said alarm signal from said monitoring element to disconnect the source of electric current from the ignition circuit,
   first time delay means connected between said monitoring element and said control means input to delay said alarm signal from said monitoring element during a first time interval, and
   second time delay means responsive to the operation of said starter means and connected to apply an inhibiting signal to said control means during a predetermined second time interval, said second time interval being shorter than said first time interval, thereby to inhibit the operation of said control means during said predetermined second time interval when starting the engine.

2. The device of claim 1, wherein said first time delay means comprises paralleled capacitor means and resistor means connected between the control means input and ground.

3. The device of claim 2 wherein a Zener diode is connected in parallel with the paralleled capacitor means and resistor means.

4. The device of claim 1 wherein a warning device is connected between said monitoring element and said first time delay means.

5. The device of claim 1, wherein said control means comprises:
   a silicon controlled rectifier having its cathode-to-anode junction connected between a point in said ignition circuit and ground, and having a gate electrode,
   a first transistor having base, emitter and collector terminals, the emitter terminal of said first transistor being coupled to the gate electrode of said silicon controlled rectifier, the collector and base terminals of said transistor being coupled to a positive voltage, and
   a second transistor having base, emitter and collector terminals, the base terminal of said second transistor being coupled to said first time delay means, the emitter terminal of said second transistor being coupled to ground, and the collector terminal of said second transistor being coupled to the base terminal of said first transistor.

6. The device of claim 5 further comprising biasing means connected to the base terminal of said second transistor and responsive to any failure in said safety device circuitry to remove the bias on the base terminal on said second transistor, thereby causing said silicon controlled rectifier to be gated on.

7. The device of claim 6 wherein said biasing means comprises:
a source of biasing voltage,
a first decoupling diode connected between said monitoring element and said source of biasing voltage, and
a second decoupling diode connected between said source of biasing voltage and said first time delay means.

* * * * *